July 6, 1965 C. B. ZIMMERMAN 3,192,814
WORK FENCE FOR RADIAL ARM SAW MACHINE
Filed June 4, 1963

*INVENTOR*
CHRISTIAN B. ZIMMERMAN

BY *Leonard Bloom*

*ATTORNEY*

United States Patent Office 3,192,814
Patented July 6, 1965

3,192,814
WORK FENCE FOR RADIAL ARM SAW MACHINE
Christian B. Zimmerman, Lancaster, Pa., assignor, by mesne assignments, to The Black and Decker Manufacturing Company, Towson, Md., a corporation of Maryland
Filed June 4, 1963, Ser. No. 285,295
1 Claim. (Cl. 83—467)

The present invention relates to a work support fence for a radial arm saw machine, and more particularly, to an adjustable and durable work fence which will not deteriorate during the operation of the machine.

The radial arm saw machine is a very versatile piece of shop equipment and may be used for a variety of purposes, such as cutting-off various work pieces of metal, wood, plastic, and other materials. When the machine is used as a cut-off saw, a reciprocable saw carriage is traversed along a stationary radial arm which projects above the work table; the carriage is provided with a power-operated circular saw blade, and the work is positioned against a fence located along the back edge of the work table. Heretofore in the prior art, the work fence has been made of wood or other fibrous materials and is intended to be cut by the saw blade. As the saw is pivoted to various miter positions, a plurality of cuts are made in the fence; and as the number of cuts in the fence increases, the work pieces are subject to being snagged, thereby creating a safety hazard for the operator of the machine. In many instances, the cuts are spaced closely together, and invariably the supporting material remaining therebetween is insufficient and tends to break out or chip. Consequently, the work fence must be scrapped and replaced with a new one; and this is especially aggravating in those applications where the radial arm saw machine is being used for heavy-duty industrial purposes, such as a metal cut-off saw.

Accordingly, it is an object of the present invention to alleviate the aforementioned deficiencies of the prior art by providing a two-piece non-deteriorating work fence, one which is adjustable for various miter positions of the saw carriage.

It is another object of the present invention to provide a non-deteriorating adjustable work fence for a radial arm saw machine, especially of the type intended for heavy-duty metal-cutting operations, wherein the fence may be constructed easily and economically from readily-available materials.

In accordance with the general teachings of the present invention, there is herein illustrated and described for use in conjunction with a radial arm saw machine having a frame and a work table secured to the frame, an adjustable non-deteriorating work fence for the machine comprising a pair of longitudinal members slidably disposed along the back edge of the work table independently of each other. These members have respective portions which project above the top surface of the work table so as to form a support or stop for the work piece, and means are provided to clamp the members to the frame of the machine independently of each other. Thus, the members are slidable along the back edge of the work table, independently of each other, and may be brought into close proximity with each other at selected points to form a continuation of the saw kerf in the table.

In accordance with the more specific teachings of the present invention, there is herein illustrated and described for use in conjunction with a radial arm saw machine adapted for metal-cutting operations and having a frame and a work table secured to the frame, an adjustable non-deteriorating work fence comprising a first longitudinal angle member secured to the frame of the machine and having one longitudinal edge thereof adjacent to the back edge of the work table. A pair of longitudinal angle members, preferably formed of aluminum, are slidably mounted on the first angle member independently of each other. Each of the pair of angle members has one longitudinal side thereof which is disposed between the back edge of the work table and the first angle member; moreover, each of the pair of angle members has a right-angularly disposed second longitudinal side thereof which is adjacent to the back edge of the work table, and which extends above the top surface of the work table to form a support or stop for a workpiece being cut by the saw. Means are provided to clamp the pair of longitudinal angle members to the first angle member, such that the pair of members are slidable independently of each other along the back edge of the work table, and such that the members may be brought into close proximity with each other at selected points along the back edge of the work table to form a continuation of the saw kerf or kerfs formed in the table.

These and other objects of the present invention will become apparent from a reading of the following specification, taken in conjunction with the enclosed drawings, in which.

Figure 1:
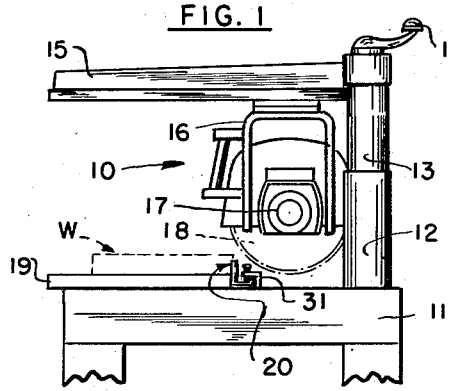
FIGURE 1 is a side elevational view of a radial arm saw machine.

With respect to FIGURE 1, there is illustrated a radial arm saw machine 10 with which the teachings of the present invention may find more particular utility although it will be understood by those skilled in the art that the essence and teachings of the present invention are equally applicable to a wide variety of power-operated tools and devices. With this in mind, the radial arm saw machine 10 comprises a frame 11, a column base 12 secured to the frame 11, a post or column 13 adjustably mounted in the column base 12, a crank or lever 14 for raising or lowering the column 13, a radial arm 15 secured to the column 13, a traversing saw carriage 16 adapted to be reciprocated along the radial arm 15, a motor 17 mounted upon the carriage 16, a circular saw blade 18 driven by the motor 17, a work table 19 upon which a workpiece W may be supported, and the adjustable non-deteriorating work fence of the present invention denoted generally by the numeral 20.

Figure 5:
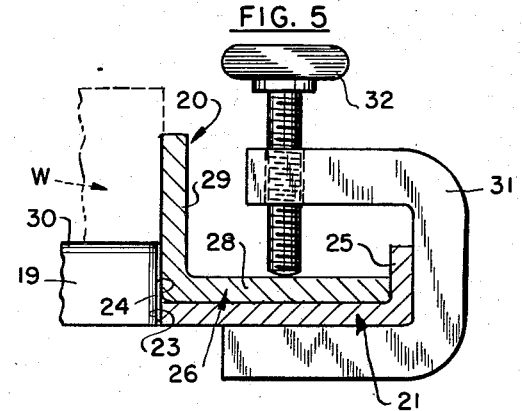
FIGURE 5 is a section view taken along the lines 5—5 of FIGURE 2, showing one of the clamps for adjustably securing the pair of angle members to the first longitudinal angle member.
Figure 2:
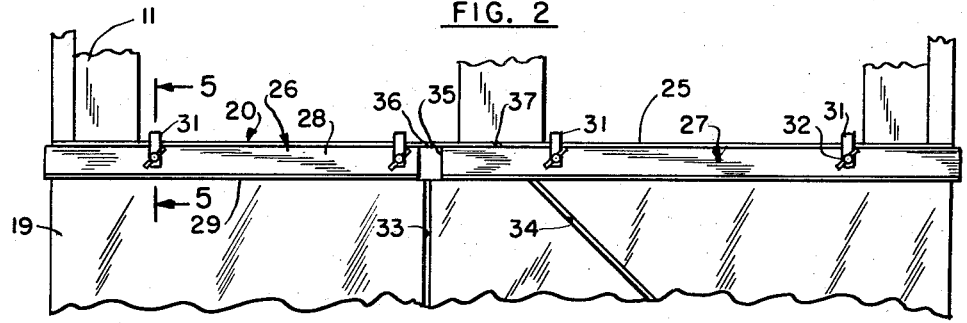
FIGURE 2 is an enlarged top plan view of the work table and of the adjustable non-deteriorating work fence of the present invention.
Figure 3:
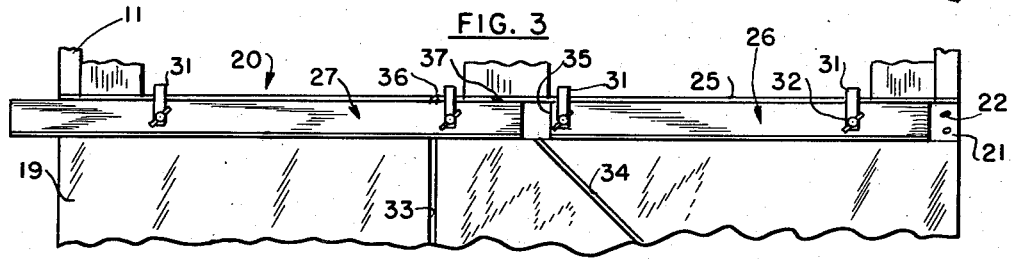
FIGURE 3 is a view corresponding substantially to that of FIGURE 2, but showing how the pair of angle members may be reversed with respect to each other and independently moved along the back edge of the work table, such that the separation therebetween now forms a continuation of the right-hand miter kerf in the table.
Figure 4:
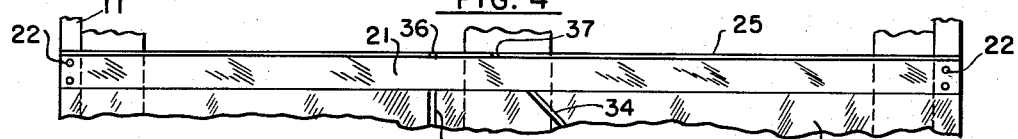
FIGURE 4 is a top plan view corresponding substantially to that of FIGURE 2, but showing the adjustable angle members removed, and further showing the first longitudinal angle member secured to the frame of the machine.
Figure 6:
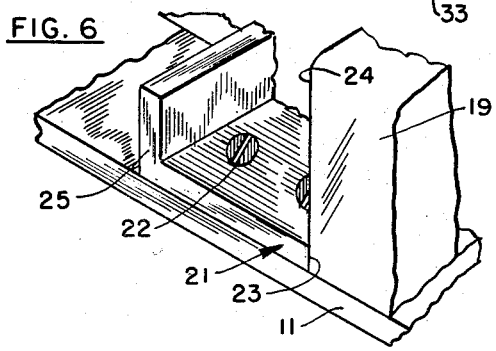
FIGURE 6 is a perspective fragmentary view of the first longitudinal angle member looking rearwardly of the machine.

With reference again to FIGURE 1, and with further reference to FIGURES 2 through 6, the adjustable non-deteriorating work fence of the present invention comprises a first longitudinal angle member 21 which is secured to the frame 11 of the machine by screws 22 as shown more particularly in FIGURES 4 and 6. The first angle member 21 has a longitudinal edge 23 which is disposed adjacent to the back edge 24 of the work table 19;

and the first angle member 21 also has a right-angularly disposed longitudinal portion 25 of relatively-shallow height and spaced from the back edge 24 of the work table 19. A pair of longiutdinal angle members 26 and 27 are slidably mounted on the first angle member 21 independently of each other. Each of the angle members 26 and 27, see FIGURE 5, has a longitudinal flat side 28 which is disposed between the back edge 24 of the work table 19 and the longitudinal portion 25 of the first angle member 21. Moreover, each of the angle members 26 and 27 has a right-angularly disposed second longitudinal side 29 thereof which lies adjacent to the back edge 24 of the work table 19 and which, see FIGURE 5, extends above the top surface 30 of the work table 19, thereby forming a support or stop for the work piece W. Means are provided to clamp the pair of angle members 26 and 27 to the first angle member 21 independently of each other. This means comprises a plurality of C-clamps 31 having respective winged screws 32. Consequently, the angle members 26 and 27 are slidable along the back edge of the work table 19 independently of each other and may be brought into close proximity with each other at selected points along the back edge of the work table 19 to form a continuation of any one of the saw kerfs in the table. As shown more particularly in FIGURES 2 and 3, the work table 19 is provided with a kerf 33 for normal cut-off operations as well as a number of auxiliary kerfs, such as the auxiliary kerf 34 which facilitates making a right-hand miter cut in the work piece W. In FIGURE 2, the angle members 26 and 27 have been slidably adjusted along the back edge of the work table 19 and have been brought into close proximity with each other, such that the separation 35 therebetween forms substantially a continuation of the kerf 33, while the longitudinal portion 25 of the first angle member 21 is provided with a fixed slot 36 to complete the continuation of the saw kerf 33. Moreover, and during use of the machine, the angle members 26 and 27 may be slidably adjusted independently of each other so that the separation 35 therebetween is kept fairly small and uniform. Moreover, and as shown more particularly in FIGURE 3, the angle members 26 and 27 may, if desired, be reversed with respect to each other, such that the separation 35 therebetween now forms a continuation of the auxiliary kerf 34 used for right-hand miter cutting operations, while another fixed slot 37 in the first angle member 31 forms a continuation of the auxiliary kerf 34.

Moreover, and as shown more particularly in FIGURE 5, the pair of angle members 26 and 27 are positioned against the longitudinal portion 25 of the first angle member 21 for greater accuracy and rigidity and are actually spaced slightly with respect to the back edge 24 of the work table 19 by approximately $1/32$ of an inch.

The two-piece work fence 20 of the present invention is essentially non-deteriorating and need not be continually replaced, yet it is quickly adjustable for normal cut-off operations as well as various miter and/or bevel cuts. Moreover, the use of aluminum angle materials, which are readily available on the commercial market, results in convenience and economy of manufacture, yet provides a firm, durable support or stop for the work piece; this enhances the safety of the machine and the quality of the work.

Obviously, many modifications may be made without departing from the basic spirit of the present invention; and accordingly, within the scope of the appended claims, the invention may be practiced other than has been specifically described herein.

I claim:

For use with a radial arm saw machine having a frame and a work table secured to the frame, the work table having a plurality of saw kerfs formed therein, and the machine further having a motor-driven saw blade traversable above the table, an adjustable non-deteriorating work fence for the machine, comprising:

(a) a first longitudinal angle member secured to the frame of the machine and having one longitudinal edge thereof disposed adjacent to the back edge of the work table;

(b) said first angle member further having a rearward upstanding longitudinal side portion with respective slots therein forming a continuation of the saw kerfs in the table;

(c) a pair of second longitudinal angle members nested within and slidably mounted on said first angle member independently of each other and in a direction parallel to the back edge of the work table;

(d) said second angle members being alined with each other and each having a respective longitudinal horizontal portion disposed below the saw kerfs in the work table;

(e) said respective longitudinal horizontal portions of said second angle members being disposed between the back edge of the work table and said rearward longitudinal side portion of said first angle member;

(f) each of said second angle members further having a right-angularly disposed upstanding longitudinal side portion thereof which is disposed adjacent to the back edge of the work table and which extends above the top surface of the work table, thereby forming a stop for a workpiece; and (g) means to clamp said pair of longitudinal angle members to said first angle member, whereby said members may be slidably adjusted independently of each other along the back edge of the work table and may be brought into close proximity with each other at selected points to form a continuation of any one of the saw kerfs in the table.

References Cited by the Examiner

UNITED STATES PATENTS

| 1,810,245 | 6/31 | Horton | 143—6.1 |
| 2,722,731 | 11/55 | Le Tarte | 269—319 |
| 2,799,305 | 7/57 | Groehn | 143—174 |
| 2,835,285 | 5/58 | Gardner | 143—6.1 |
| 2,949,139 | 8/60 | Nolte | 143—6.43 |

ANDREW R. JUHASZ, *Primary Examiner.*